United States Patent [19]

Kawasaki

[11] Patent Number: 4,732,778
[45] Date of Patent: Mar. 22, 1988

[54] METHOD FOR FORMING COMPOSITE LAYER BY LASER IRRADIATION UPON ALUMINUM ALLOY SUBSTRATE SURFACE OF POWDER MIXTURE CONTAINING METAL CARBIDE CERAMIC PARTICLES, SILICON, AND METAL ELEMENT FORMING INTER METALLIC COMPOUND WITH SILICON

[75] Inventor: Minoru Kawasaki, Toyota, Japan

[73] Assignee: Toyota Jidosha Kabushiki Kaisha, Toyota, Japan

[21] Appl. No.: 902,624

[22] Filed: Sep. 2, 1986

[30] Foreign Application Priority Data

Aug. 30, 1985 [JP] Japan .................. 60-191393

[51] Int. Cl.$^4$ ................................................ B23K 9/06
[52] U.S. Cl. ............................ 427/53.1; 219/121 LE; 219/76.1
[58] Field of Search ............... 427/53.1; 219/121 LE, 219/76.1

[56] References Cited

U.S. PATENT DOCUMENTS

T967,009  2/1978  Gale ......................................... 427/53
4,299,860  11/1981  Schaefer ................................. 427/53.1

*Primary Examiner*—Sam Silverberg
*Attorney, Agent, or Firm*—Oblon, Fisher, Spivak, McClelland & Maier

[57] ABSTRACT

In a method for forming a covering composite layer on the surface of an aluminum alloy substrate, a powder mixture containing ceramic carbide of a metal, silicon and a metal element which forms with silicon an inter metallic compound having a specific gravity comparable with that of the ceramic carbide is disposed upon the surface of the aluminum alloy substrate, and then the powder mixture so disposed is irradiated with a laser, so that the silicon and the metal element which forms the inter metallic compound with silicon in the powder mixture and a surface portion of the aluminum alloy substrate are melted and fused together. The silicon expedites uniform distribution of the ceramic carbide particles in a molten surface layer of the aluminum alloy substrate by producing a melt of the inter metallic compound having a specific gravity comparable with the ceramic carbide, thereby preventing segregation of the ceramic carbide particles due to specific gravity difference, while highly uniformly dispersing the ceramic carbide particles are carried by the inter metallic compound having affinity toward the aluminum alloy due to silicon component.

20 Claims, 14 Drawing Figures

(×10)

(×10)

(×10)

(×10)

(×10)

METHOD FOR FORMING COMPOSITE LAYER BY LASER IRRADIATION UPON ALUMINUM ALLOY SUBSTRATE SURFACE OF POWDER MIXTURE CONTAINING METAL CARBIDE CERAMIC PARTICLES, SILICON, AND METAL ELEMENT FORMING INTER METALLIC COMPOUND WITH SILICON

BACKGROUND OF THE INVENTION

The present invention relates to a method for performing a surface treatment upon a substrate metal which is an alloy of aluminum, and more particularly relates to a method for forming a composite layer upon the surface of a substrate metal, said layer consisting largely of aluminum alloy and ceramic particles of a carbide of a metal mixed in therewith, which the composite layer is formed by the use of a laser.

In order to improve the surface qualities of a portion of the surface of a quantity of a substrate metal material such as aluminum alloy, such as for example in order to improve the corrosion resistance, the heat resistance, or the wear resistance of the surface of a member at least largely made of such substrate aluminum alloy metal material, it is per se known to be effective to disperse ceramic particulate material into said surface portion of said substrate aluminum alloy metal material, since such ceramic particles typically have per se high strength and high hardness and are superior with regard to the qualities of heat resistance and corrosion resistance. Thereby, a surface layer is formed on the aluminum alloy substrate, said surface layer consisting largely of aluminum alloy and ceramic particles of said ceramic mixed in therewith. One way in which this surface alloying has been performed in the prior art has been to dispose a quantity of the appropriate ceramic powder material on the surface of the substrate aluminum alloy metal material, and then to fuse together said ceramic powder material and said substrate aluminum alloy metal material by heating by the use of a high energy source such as a laser, a TIG arc, or an electron beam. After the fused portion has solidified, a composite layer is thus formed, said composite layer, if the parameters of the process are appropriate and correct, having the appropriately enhanced surface properties.

However, this type of process is fraught with problems which will now be outlined, and in practice these problems have doomed all trials for thus forming a composite surface layer consisting of aluminum alloy and ceramic particles to failure.

The first reason for the above fact is thought to be that, since surface heating by a laser occurs substantially locally over a relatively short period of time, the molten metal layer solidifies without being well stirred up.

The second reason for the above is thought to be that, since such ceramic particles typically have poor wettability with regard to such molten aluminum alloy, said ceramic particles are very difficult to be well dispersed in the molten aluminum alloy.

The third reason for the above is thought to be that, since such ceramic particles typically have higher specific gravity than such molten aluminum alloy, when as described above said ceramic particles are attempted to be dispersed within such aluminum alloy, they tend to gather at the bottom portion of the molten aluminum alloy mass, due to the difference in the specific gravities.

Furthermore, as a fourth reason for problems to occur, if the ceramic particles to be dispersed in the surface layer on the aluminum alloy substrate material are particles composed of a metal oxide such as $Al_2O_3$, $SiO_2$, or the like, or are particles of a metal nitride such as $Si_3N_4$, AlN, or the like, then some of said ceramic particles will decompose in the molten aluminum alloy substrate metal layer when they are heated to high temperature as by a laser. For example, ceramics composed of metal oxide tend to decompose to produce oxygen, and similarly ceramics composed of metal nitride tend to decompose to produce nitrogen, and these gases thus produced, which are evolved, tend to create blow holes or pin holes in the composite material layer finally produced. Therefore, in the case when a composite material layer is to be formed on the surface of an aluminum alloy substrate by the method described above, if the ceramic particles to be dispersed in said composite material layer are composed of an oxide of a metal or of a nitride of a metal, it is very difficult to form a composite layer in which the ceramic particles are uniformly dispersed, said composite layer having an acceptably low level of defects such as blow holes.

SUMMARY OF THE INVENTION

The inventor of the present invention has considered the various problems detailed above in the case when a composite layer including such well dispersed ceramic particles is to be formed on the surface of an aluminum alloy substrate material, from the point of view of the desirability of utilizing a laser as the heat source for melting and fusing together said composite layer; and, as a result of various experimental researches to be detailed hereinafter, the present inventor has come to the knowledge that, if ceramic particles composed of a carbide of a metal are selected as the ceramic particles to be dispersed in the composite layer, it is effective to dispose a powder mixture composed essentially of a powdered ceramic carbide of a metal and a metal powder containing silicon and a metal which forms an inter metallic compound with silicon on the surface of the aluminum alloy substrate metal piece, and then to heat said powder mixture by a laser so as to melt the metal powder included therein and also the surface portion of the aluminum alloy substrate material. And the present inventor has discovered as a result of said experimental researches that by doing this a composite material layer can be formed on the surface of the aluminum alloy substrate material, having uniformly dispersed in it said powder particles formed of said ceramic carbide of a metal, without generating significant quantities of any defects such as blow holes or pin holes. The present invention is based upon the knowledge obtained as a result of said various experimental researches conducted by the present inventor.

Accordingly, it is the primary object of the present invention to provide a method for forming a composite layer including dispersed ceramic particles on the surface of an aluminum alloy substrate by the use of a laser, which avoids the problems detailed above.

It is a further object of the present invention to provide such a method for forming a composite layer including dispersed ceramic particles on the surface of an aluminum alloy substrate, which provides good and easy dispersion within the surface layer of the aluminum alloy substrate of the ceramic powder material applied thereon.

It is a further object of the present invention to provide such a method for forming a composite layer including dispersed ceramic particles on the surface of an aluminum alloy substrate, which does not require an unduly high thermal energy output from the laser.

It is a further object of the present invention to provide such a method for forming a composite layer including dispersed ceramic particles on the surface of an aluminum alloy substrate, which does not run any risk of thermal decomposition of said ceramic particles.

It is a further object of the present invention to provide such a method for forming a composite layer including dispersed ceramic particles on the surface of an aluminum alloy substrate, which does not entail the ceramic powder material becoming clumped or concentrated at the bottom of the composite layer produced.

It is a further object of the present invention to provide such a method for forming a composite layer including dispersed ceramic particles on the surface of an aluminum alloy substrate, which does not result in the production of defects such as pits or recesses or blow holes or pin holes or the like in the aluminum alloy substrate material or in the composite layer including dispersed ceramic particles.

It is a yet further object of the present invention to provide such a method for forming a composite layer including dispersed ceramic particles on the surface of an aluminum alloy substrate, which does not entail either high capital cost or high operational cost.

It is a yet further object of the present invention to provide such a method for forming a composite layer including dispersed ceramic particles on the surface of an aluminum alloy substrate, which provides a composite layer including dispersed ceramic particles of relatively uniform constitution.

According to the most general aspect of the present invention, these and other objects are attained by a method for forming a composite layer on the surface of an aluminum alloy substrate, comprising the steps of: (a) disposing a powder mixture, containing a ceramic powder of a carbide of a metal and a metallic powder containing silicon and a metal element which forms an inter metallic compound with silicon, upon the surface of said aluminum alloy substrate; and: (b) irradiating with a laser said powder mixture as disposed upon said surface of said aluminum alloy substrate, so as to melt said metallic powder in said powder mixture and a surface portion of said aluminum alloy substrate and so as to fuse said powder mixture and said surface portion of said aluminum alloy substrate together.

According to the results of the experimental researches carried out by the inventor of the present application, as will be detailed later, it has been determined that in the comparison cases, not according to the present invention—in which either: (a) the powder mixture disposed upon said surface of said aluminum alloy substrate consists only of a powder of a ceramic carbide of a metal; or (b) said powder mixture disposed upon said surface of said aluminum alloy substrate consists of a powder of a ceramic carbide of a metal mixed with a powder containing only silicon; or (c) said powder mixture disposed upon said surface of said aluminum alloy substrate consists of a powder of a ceramic carbide of a metal mixed with a powder containing only an alloy metal element—it is actually impossible to form a composite layer having uniformly and evenly disposed particles of said ceramic carbide of a metal. The reason for this fact in cases (b) and (c) will now be considered.

The reason why a composite layer having uniformly and evenly disposed particles of said ceramic carbide of a metal cannot be produced in practice in the case (b) is thought to be that, although silicon powder and said powder of said ceramic carbide of a metal are melted into the substrate aluminum alloy material, and although silicon diffuses uniformly into such molten substrate aluminum alloy material, the particles of said ceramic carbide of a metal tend to gather together, due to the difference in specific gravity between the molten substrate aluminum alloy material and the ceramic particles of said carbide of a metal, and due to the fact that said ceramic made of said carbide of a metal cannot make a metallic combination with silicon and aluminum. On the other hand, the reason why a composite layer having uniformly and evenly disposed particles of said ceramic carbide of a metal cannot be produced in practice in the case (c) is thought to be that the particles of said ceramic carbide of a metal and said alloying metal element have too high specific gravities in comparison to the aluminum alloy substrate metal. Another reason is thought to be that, although a small portion of the alloying metal element enters into solid solution in combination with said aluminum alloy substrate metal or makes a metallic compound or a so called inter metallic compound therewith, the particles of said ceramic carbide of a metal tend to gather together in the absence of silicon which serves to uniformly disperse said particles of said ceramic carbide of a metal.

Therefore, in order to uniformly disperse such particles of said ceramic carbide of a metal into the surface portion of the aluminum alloy substrate, it is necessary that the material which is to be disposed together with said particles of said ceramic carbide of a metal on the surface of the aluminum alloy substrate material piece should satisfy the following four requirements:

(1) it should have a specific gravity which is similar to close to that of said particles of said ceramic carbide of a metal;

(2) it should contain silicon, which serves to uniformly disperse said particles of said ceramic carbide of a metal;

(3) it should contain an element which enters into a metallic combination with silicon; and:

(4) it should contain an element which enters into a metallic combination with said particles of said ceramic carbide of a metal.

However, since it is metallurgically impossible for said material which is to be disposed together with said particles of said ceramic carbide of a metal on the surface of the aluminum alloy substrate material piece to satisfy the requirement (4) above, this requirement is necessarily waived. In order, therefore, to satisfy the requirements (1), (2), and (3), said material which is to be disposed together with said particles of said ceramic carbide of a metal on the surface of the aluminum alloy substrate material piece is required to produce an inter metallic compound with silicon by entering into metallic combination with silicon.

Thus, according to the present invention, since there is employed, for being disposed together with said particles of said ceramic carbide of a metal on the surface of the aluminum alloy substrate material piece, a metalic powder containing silicon and a metal element which forms an inter metallic compound with silicon, thereby the silicon serves to uniformly disperse said particles of said ceramic carbide of a metal into the aluminum alloy substrate material; and further, since said silicon and said metal element which forms an inter metallic compound with silicon react with one another to form an inter metallic compound which has a specific gravity similar to or close to that of said ceramic carbide of a metal, thereby a composite layer consisting of aluminum alloy substrate material with said particles of said ceramic carbide of a metal uniformly dispersed therein can be formed on the surface of the aluminum alloy substrate material piece. And, since the ceramic powder used is a ceramic carbide of a metal, which does not evolve or produce any gas when heated even to a relatively high temperature as by a laser, thereby it is ensured that a composite layer including said ceramic particles can be formed with no substantial generation of defects such as blow holes or the like.

Further, according to a particular specialization of the present invention, the above specified and other objects may be more particularly attained by a method for forming a composite layer on the surface of an aluminum alloy substrate as specified above, wherein said metallic powder is a mixture of a powder of silicon and a powder of said metal element which forms an inter metallic compound with silicon. However, according to the results of certain experimental researches performed by the present inventor, to be detailed hereinafter, it has been determined that it is more preferable for said metallic powder to be a powder of an alloy of silicon with said metal element which forms an inter metallic compound with silicon.

Further, according to the results of said experimental researches performed by the present inventor, it has been determined that if the content of said powder of a ceramic carbide of a metal included in said powder mixture is too high or if the silicon content is too low, it becomes difficult to uniformly disperse the ceramic particles. Therefore, according to another particular specialization of the present invention, it is considered preferable for the content of said powder of a ceramic carbide of a metal included in said powder mixture to be between about 0.1% and about 20%, and for the content of silicon included in said powder mixture to be between about 5% and about 95%; and, more preferably, said content of said powder of a ceramic carbide of a metal included in said powder mixture should be between about 0.5% and about 15%, and said content of silicon included in said powder mixture should be between about 7% and about 90%.

And, yet further, according to the results of said experimental researches performed by the present inventor, it has been determined that, in order to uniformly disperse the particles of said powder of a ceramic carbide of a metal included in said powder mixture, it is preferable that the inter metallic compound formed by the reaction of silicon and said metal element which forms an inter metallic compound with silicon should have a specific gravity similar or close to the specific gravity of said particles of said powder of a ceramic carbide of a metal. Therefore, according to another particular specialization of the present invention, it is considered preferable for the ratio of the specific gravity of said inter metallic compound formed by silicon and said metal element which forms an inter metallic compound with silicon to the specific gravity of said ceramic carbide of a metal to be between about 0.7 and about 2.0; and, more preferably, said specific gravity ratio should be between about 0.8 and about 1.5.

According to yet another particular specialization of the present invention, the mixture of said powder mixture and said surface portion of said aluminum alloy substrate, as fused and melted by said laser, may be cooled and solidified principally by heat conduction to the main body of said aluminum alloy substrate. According to this, no special means is required for cooling said fused and molten portion, and yet said molten portion is relatively rapidly cooled, as a result of which the crystalline structure thereof is relatively fine, and therefore a composite layer of high strength and good hardness can be formed on the surface of the aluminum alloy substrate material piece.

According to yet another particular specialization of the present invention, said irradiation of said powder for alloying as disposed upon said surface of said aluminum alloy substrate by said laser may be performed in an inert atmosphere. According to this concept, the occurrence of defects such as the inclusion of relatively large amounts of metallic oxides in the composite layer due to oxidation of the alloying powder and the formation of blow holes and the like is avoided. In this case, the inert atmosphere may be provided by a flux such as in the case of welding, but for positive results and to avoid envelopment and entangling of the work in slag, and to improve workability, it is preferable to employ an inert gas atmosphere composed of a gas such as argon or helium or the like, or indeed a vacuum atmosphere.

Now, to consider the manner in which the powder mixture is disposed in the path of the laser beam, according to a yet another particular specialization of the present invention, said powder mixture may be disposed upon said surface of said aluminum alloy substrate by being supplied in loose powder form thereonto into the path of the beam produced by said laser. In this case, a carrier inert gas may be fed into said loose powder form supply of said powder mixture. However, in order properly to prevent dispersal of said powder mixture, it is really more preferable, alternatively, to dispose a compressed powder form of said powder mixture upon said surface of said aluminum alloy substrate, optionally by forming grooves in said surface of said aluminum alloy substrate and by compression forming said compressed powder form of said powder mixture into said grooves. Alternatively, said powder mixture may be disposed upon said surface of said aluminum alloy substrate by being applied thereon as a paste including a binder, such as for example an aqueous solution of polyvinyl alcohol or a mixture of acrylic and thinner. The application of such a paste upon said surface of said aluminum alloy substrate may be by application by a spatula or via a tube, and, in the case where the thickness of the composite layer to be formed on the surface of the aluminum alloy substrate is small, said powder mixture may be formed into a slurry by dispersal in a solvent such as for example an aqueous solution of polyvinyl alcohol, and then this slurry may be applied to the surface of the aluminum alloy substrate by painting with a brush or the like, by spraying, or by dipping. When, however, a paste or a slurry is formed, it is preferable for the thermal fusing process by the beam of the laser to be performed when it is ensured that the slurry contains substantially no water, i.e. after sufficient drying at an appropriate temperature range in an atmosphere such that pores are not produced in the surface portion of the slurry layer and such that said surface portion of the slurry layer is not substantially oxidized.

It should be noted that, in the present specification, all percentages are percentages by weight.

BRIEF DESCRIPTION OF THE DRAWINGS

The present invention will now be described with respect to the preferred embodiments thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures relating to one preferred embodiment, and like parts and gaps and spaces and so on in the figures relating to different preferred embodiments; and:

DESCRIPTION OF THE PREFERRED EMBODIMENTS

Figure 1:
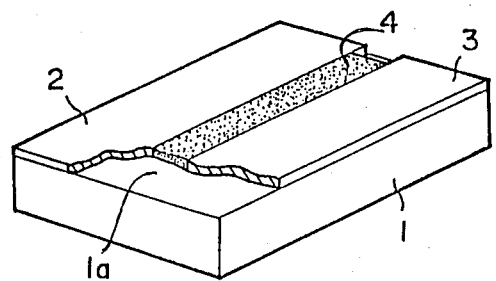
FIG. 1 is a side perspective partly cut away view of a first stage of practice of the first preferred embodiment of the composite layer forming method of the present invention, as well as of three comparison composite layer forming methods, in which there is shown the forming by molding of a strip layer of compounding powder on the surface of an aluminum alloy substrate block.

The present invention will now be described with reference to the preferred embodiments thereof, and with reference to the figures.

THE FIRST PREFERRED EMBODIMENT, WITH COMPARISON METHODS

FIGS. 1 through 4 show successive stages of the general method of practice of the first preferred embodiment of the ceramic composite layer on aluminum alloy substrate forming method of the present invention, as well as of comparison methods.

Initially, a first quantity designated as "A" of powder was produced by evenly combining together a quantity of TiC powder of average particle size approximately 50 microns and a quantity of a powdered form of an alloy (composition approximately 20% copper, and balance substantially silicon) of average particle size approximately 80 microns. The approximate composition of this powder "A" is shown in Table 1. This powder quantity "A" was, as will be seen, constituted so as to be suitable for practice of the first preferred embodiment of the method of the present invention. And, for the practice of a comparison method not according to the present invention, a second quantity designated as "B" of powder was produced by taking only a quantity of said TiC powder of average particle size approximately 50 microns. For the practice of another comparison method not according to the present invention, there was produced a quantity designated as "C" of a third powder, by evenly combining together a quantity of said TiC powder of average particle size approximately 50 microns and a quantity of a silicon powder of average particle size approximately 80 microns. The approximate composition of this powder "C" is shown in Table 1. And, for the practice of yet another comparison method, there was produced a quantity designated as "D" of a fourth powder, by evenly combining together a quantity of said TiC powder of average particle size approximately 50 microns and a quantity of a copper powder of average particle size approximately 40 microns. The approximate composition of this powder "D" is shown in the Table. Next, to each of these powders for alloying there was added a quantity of 5% aqueous solution of polyvinyl alcohol, to serve as a binder, and thus in each of the four cases there was formed a paste with a viscosity higher than that of water and lower than that of clay.

TABLE

| Compounding powder | Composition |
| --- | --- |
| A | 76% Si, 19% Cu, 5% TiC |
| B | 100% TiC |
| C | 70% Si, 30% TiC |
| D | 70% Cu, 30% TiC |

Next, four substrate material test sample pieces 1 were prepared, each being a cuboidal block with dimensions approximately 70 mm×40 mm×10 mm, and being made of aluminum alloy of JIS (Japanese Industrial Standard) ADC-10. And as shown in the side perspective view of FIG. 1, which shows in partially cut away view the first stage of practice of this first preferred embodiment and these three comparison methods, on each of the 70 mm×40 mm surfaces denoted as 1a of these four aluminum alloy substrate material pieces 1 there were laid two guide plates 2 and 3 of suitable material, of thickness about 1.0 mm, with their longer edges parallel to and confronting one another and separated by about 5 mm. And then, for each of these four assemblies, a quantity designated as 4 of one of the above described four pastes made from the powder quantities "A", "B", "C" and "D" was packed into the gap between said two guide plates 2 and 3, with the top of said quantity 4 of paste leveled off.

Figure 2:
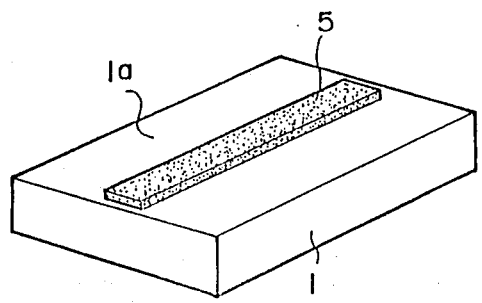
FIG. 2 is a side perspective view of a second stage of practice of said first preferred embodiment and of said three comparison methods, showing said alloy powder strip layer with the molds therefor having been removed.

In the next stage, not particularly shown in any figure, each of the assemblies as shown in FIG. 1 was heated to a temperature of about 100° C. in a drying oven and was maintained at said temperature for about one hour; thus in each case the powder paste quantity 4 was thoroughly dried. Then, in each case, the two guide plates 2 and 3 were removed, to leave as shown in FIG. 2 in perspective view of the block 1 of aluminum alloy substrate material with a strip layer 5 of the corresponding compounding powder laid along its 70 mm×40 mm surface 1a parallel to and midway between the long sides thereof, said strip layer 5 being bound together and congealed to the block 1 by the hardened binder. In each case, said strip layer 5 had width about 4.8 mm and thickness about 1.0 mm.

Figure 3:
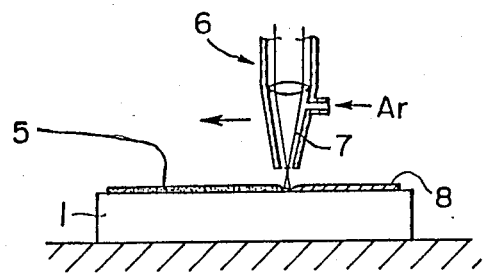
FIG. 3 is a side view of a third stage of practice of said first preferred embodiment and of said three comparison methods, showing a laser gun being scanned along such a strip layer of ceramic powder material from one end thereof to the other.
Figure 4:
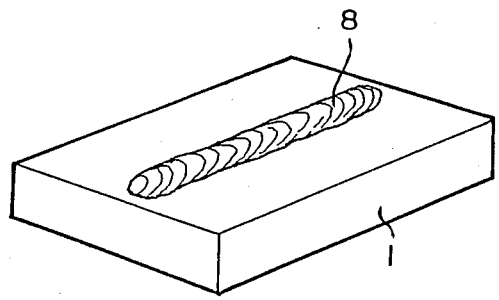
FIG. 4 is a side perspective view showing the appearance of the resultant beads of fused and melted together compounding powder material and substrate aluminum alloy material formed along the surface of the substrate material blocks.

Next, as shown in side view of FIG. 3, a laser gun 6 was scanned in one pass along each of these strips 5 of congealed powder material for being formed into a composite material with the substrate aluminum alloy block 1, from one end thereof to the other, while simultaneously a stream of argon gas was emitted from the end of said laser gun 6, said argon gas stream acting as a shield gas. The laser gun 6 was at this time operated so as to emit laser radiation, denoted in FIG. 3 as 7, and this process caused local heating of the strip 5 of material for fusing and melting thereof (actually, of the metal component thereof, if any) into the material of the substrate aluminum alloy block. The laser output was about 2.0 kilowatts; the output mode was multi mode; the beam pattern was elliptical, with the long diameter about 5 mm and the short diameter about 3.5 mm; the laser scanning speed was about 300 mm per minute; and the flow rate of the argon shield gas was about 35 liters per minute. Thus, as shown in side perspective view in FIG. 4, a bead portion 8 of fused and melted together ceramic powder material (powder or strip) and substrate aluminum alloy material, in the cases "A", "C", and "D" with some admixture of silicon and/or copper, was formed along the 70 mm×40 mm surface 1a of each substrate material block 1, parallel to and midway between the long sides thereof. During this process, the molten portion was cooled rapidly, principally by absorption of the heat therein by the main body of the substrate material block 1.

Figure 5:
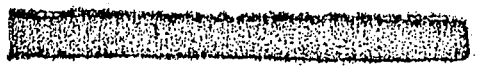
FIG. 5 is a plan view showing the appearance of the said bead, produced according to said first preferred embodiment of the present invention.
Figure 6:
FIG. 6, similarly to FIG. 5 for the first preferred embodiment, is a plan view showing the appearance of the said bead, produced according to the first comparison method, not according to the present invention.
Figure 7:
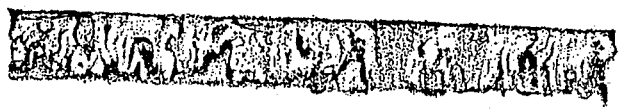
FIG. 7, similar to FIG. 5 for the first preferred embodiment and to FIG. 6 for the first comparison method, is a similar plan view, showing the appearance of the said bed, produced according to the second comparison method, not according to the present invention.
Figure 8:
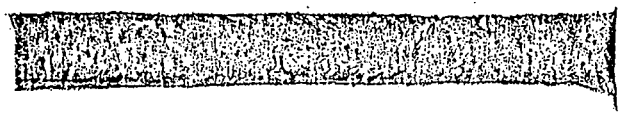
FIG. 8, similarly to FIG. 5 for the first preferred embodiment and to FIGS. 6 and 7 for the first and second comparison methods, is a plan view, showing the appearance of the said bead, produced according to the third comparison method, also not according to the present invention.

FIGS. 5 through 8 are plan views showing the bead portions 8 (i.e., the composite layers) formed in each of the four cases described above, by employing the materials including ceramic powder "A", "B", "C", and "D" respectively; thus, FIG. 5 was made according to the preferred embodiment of the ceramic composite layer on aluminum alloy substrate forming method of the present invention, by utilizing TiC powder mixed in with the alloy powder of silicon and copper, while FIGS. 6, 7 and 8 were made by comparison methods not according to the present invention. Further, FIGS. 9 through 12 are cross sectional photomicrograph views at enlargements of 10X taken transversely through the bead portions 8 produced as described above, utilizing the ceramic powder materials "A" through "D", respectively. In the case of the first preferred embodiment of the present invention which utilized the ceramic powder material "A", the composite layer bead portion 8 was about 1.2 mm by about 4.8 mm in cross sectional dimensions, had surface hardness about 350 to 450 (Hv=5 kg), and had good surface appearance; in the case of the first comparison method which utilized the ceramic powder material "B" which contained only TiC powder, the composite layer bead portion 8 was not formed, while the aluminum alloy substrate material which remained had surface hardness about 80 to 90, and had bad surface appearance; in the case of the second comparison method which utilized the ceramic powder material "C" which contained Ti powder and silicon powder without any admixture of copper with the silicon, the composite layer bead portion 8 was not properly formed, insofar as it could be determined had surface hardness about 80 to 550 (550 were agglomerations of TiC powder were generated), and the surface appearance of the general area thereof was poor; and similarly, for the case of the third comparison method which utilized the ceramic powder material "D" which contained Ti powder and copper powder without any admixture of silicon with the copper, the composite layer bead portion 8 was about 0.8 mm by about 4.2 mm in cross sectional dimensions, insofar as it could be determined had a similar surface hardness about 100 to 550 (550 where agglomerations of TiC powder were generated), and again the surface appearance of the general area thereof was poor.

Figure 9:
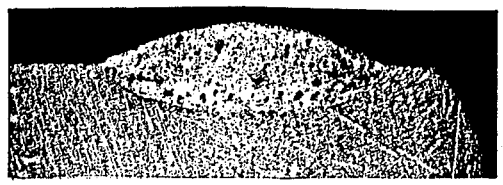
FIG. 9 is a transverse cross sectional photomicrograph taken at a magnification of 10X, showing said bead produced according to said first preferred embodiment of the present invention.

From the plan view of FIG. 5 and the sectional view of FIG. 9, and from the Table, it will be understood that, when surface alloying is performed according to the first preferred embodiment (utilizing ceramic powder material "A" containing mixed TiC powder and powder of an alloy of silicon and copper), the external appearance and tidyness of the bead 8 is of good quality, and the fusing penetration into the substrate aluminum alloy material is good, and a composite layer with no substantial defects such as blow holes can be formed on the surface of the aluminum alloy substrate block, with the TiC particles well and uniformly dispersed within said composite layer. In FIG. 9, the portions showing up as spot portions of black color in the composite layer are TiC particles, while the ground portions of white color are the matrix of Si-Cu-Al alloy material.

Figure 10:
FIG. 10, similarly to FIG. 9 for the first preferred embodiment, is a transverse cross sectional photomicrograph taken at a magnification of 10X, showing the bead produced according to the first comparison method, not according to the present invention.
Figure 11:
FIG. 11, similarly to FIG. 9 for the first preferred embodiment and to FIG. 10 for the first comparison method, is a transverse cross sectional photomicrograph taken at a magnification of 10X, showing the bead produced according to the second comparison method, also not according to the present invention.
Figure 12:
FIG. 12, similarly to FIG. 9 for the first preferred embodiment and to FIGS. 10 and 11 for the first and second comparison methods, is a transverse cross sectional photomicrograph taken at a magnification of 10X, showing the bead produced according to the third comparison method, also not according to the present invention.

On the other hand, from the plan view of FIG. 6 and the sectional view of FIG. 10, and from the Table, it will be understood that, when surface alloying was performed according to the first comparison method by utilizing as ceramic powder material only TiC powder without any admixture of any metalic powder thereto (ceramic powder material "B"), although the ceramic powder material was fused on the surface of the aluminum alloy substrate block, it did not penetrate enough into the surface of said substrate block, so that a proper surface composite layer was not substantially formed at all. And, similarly, from the plan view of FIG. 7 and the sectional view of FIG. 11, and from the Table, it will be understood that, when surface alloying was performed according to the second comparison method by utilizing as ceramic powder material a mixture of TiC powder and silicon powder of silicon only (ceramic powder material "C"), although the ceramic powder material was fused on the surface of the aluminum alloy substrate block and also penetrated thereinto, large recesses and holes were generated at various sites in the bead portion 8, and further the TiC particles were considerably segregated into lumps. And, similarly, from the plan view of FIG. 8 and the sectional view of FIG. 12, and from the Table, it will be understood that, when surface alloying was performed according to the third comparison method by utilizing as ceramic powder material a mixture of TiC powder and copper powder of copper only (ceramic powder material "D"), although the ceramic powder material was fused on the surface of the aluminum alloy substrate block and also penetrated thereinto, and although a bead of relatively good quality was formed, TiC particles and Cu which appear as black portions in the cross section of the bead shown in FIG. 12 were considerably segregated.

A variant embodiment

As a variant preferred embodiment of the present invention, another quantity of ceramic powder was produced by evenly combining together a quantity of TiC powder of average particle size approximately 50 microns, a quantity of silicon powder of average particle size approximately 50 microns, and a quantity of copper powder of average particle size also approximately 50 microns. The approximate composition of this powder was substantially the same as that of the ceramic powder "A" relating to the first preferred embodiment and shown in Table 1; however, it will be appreciated that the silicon and the copper, in this variant preferred embodiment, rather than being alloyed together and the alloy subsequently being formed into a powder, were individually powdered and then subsequently mixed together in powder form, so as to form a powder mixture. And a substrate material test sample piece was prepared, of substantially the same dimensions of approximately 70 mm×40 mm×10 mm as in the case of the previously described first preferred embodiment, and again being made of substantially the same type of aluminum alloy of JIS (Japanese Industrial Standard) ADC-10. And a composite layer bead was formed in substantially the same manner as in the case of the first preferred embodiment disclosed above, the parameters of this laser fusing process being substantially as in the case of said first preferred embodiment. The results of this test were found to be generally similar to those detailed above with regard to the first preferred embodiment and shown in FIGS. 5 and 9, and it was confirmed that a composite layer of good quality could be formed on the surface of the aluminum alloy substrate piece.

THE SECOND PREFERRED EMBODIMENT

Figure 13:
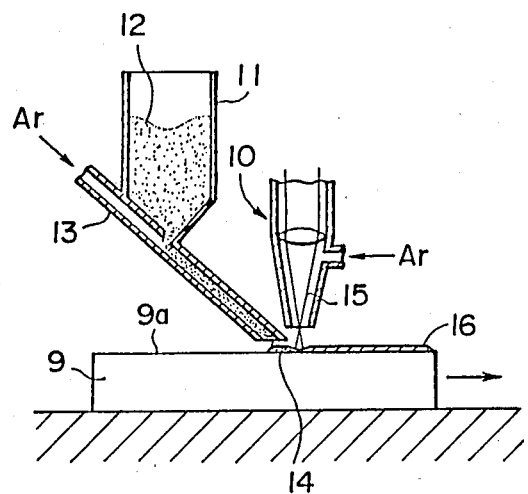
FIG. 13, similarly to FIG. 3 for the first preferred embodiment, is a side view showing the laser fusing step performed during the practice of the second preferred embodiment of the method for forming a composite layer on a substrate of the present invention.

The laser fusing step performed during the practice of the second preferred embodiment of the method for forming a composite layer on a substrate of the present invention is shown in side view in FIG. 13, in a similar manner to FIG. 3 relating to the first preferred embodiment. In detail, this second preferred embodiment was performed as follows. Initially, a quantity of powder was produced by evenly combining together a quantity of MoC powder of average particle size approximately 50 microns and a quantity of a powdered form of an alloy (composition approximately 20% Mo, and balance substantially silicon) of average particle size approximately 80 microns. The approximate composition of this powder was about 76% Si, about 19% Mo, and about 5% MoC. This powder quantity was, as will be seen, constituted so as to be suitable for practice of the second preferred embodiment of the method of the present invention. Next, a substrate material test sample piece 9 was prepared, of substantially the same dimensions of approximately 70 mm×40 mm×10 mm as in the case of the first preferred embodiment, and made of the same material.

Next, as shown in side view in FIG. 13, a laser gun 10 was scanned in one pass along this substrate aluminum alloy block 9, from one end thereof to the other along the central portion of a 70×40 mm face 9a thereof and parallel to the 70 mm long sides of said face 9a, while simultaneously a stream of argon gas was emitted from the end of said laser gun 10, said argon gas stream acting as a shield gas; and, further, onto said upper face 9a of said alloy block 9 just into the path of said laser gun 10 and before it there was fed a steady stream of the above described powder, a mass 12 of which was held in a hopper 11 a lower portion of which opened into an intermediate position along a downwardly sloping pipe 13 from which said powder stream thus sifted and emerged, along with another admixture stream of argon gas which further was fed through said pipe 13 as a carrier gas. The laser gun 10 was at this time operated so as to emit laser radiation, denoted in FIG. 13 as 15, and this process caused local heating of the upper surface of the alloy block 9 and of the powder just laid thereon, for fusingly alloying and melting thereof into a molten composite layer 14 in the path of under and behind the laser gun 10, and said molten composite layer hardened into a bead 16 trailing behind the laser gun 10. As before: the laser gun output was about 2.0 kilowatts; the output mode was multi mode; the beam pattern was elliptical, with the long diameter about 5 mm and the short diameter about 35 mm; the laser gun scanning speed was about 300 mm per minute; and the flow rate of the argon shield gas was about 35 liters per minute. Thus a bead portion 16 of fused and melted together powder material and substrate aluminum ceramic powder material was formed along the 70 mm×40 mm surface 9a of the substrate material block 9, parallel to and midway between the long sides thereof. During this process, the molten portion 14 was cooled rapidly to form said hardened bead portion 16, principally by absorption of the heat in said bead portion 14 by the main body of the substrate material block 9.

Figure 14:
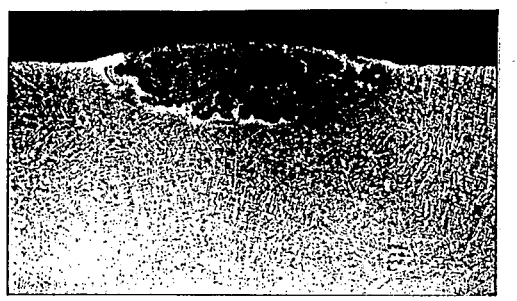
FIG. 14, similarly to FIG. 9 for the first preferred embodiment and to FIGS. 10 through 12 for the first through the third comparison methods, is a transverse cross sectional photomicrograph taken at a magnification of 10X, showing the bead produced according to the second preferred embodiment of the present invention.

FIG. 14 is a cross sectional optical photomicrograph view at an enlargement of 10X taken transversely through the bead portion 16 produced by said second preferred embodiment ceramic composite layer on aluminum alloy substrate forming method of the present invention. In this case, the composite layer bead portion 16 was about 4.9 mm by about 1.2 mm in cross sectional dimensions (width and depth respectively), had surface hardness (Hv=about 5 kg) of about 300 to 350, and had good surface appearance. From the sectional view of FIG. 14, it will be understood that, if surface alloying is performed according to this second preferred embodiment, the external appearance and tidyness of the bead 16 is of good quality, and a composite layer incorporating uniformly dispersed MoC ceramic particles with no substantial defects such as blow holes can be formed on the surface of the aluminum alloy substrate block 9. It should be noted that in FIG. 14 the portions showing up as black spots of color in the composite layer are MoC particles, the ground portions of dark gray color are those portions which are made of the Si-Mo-Al alloy matrix, while the diamond shaped portions of black color are press marks which were formed during the measurements of the hardness.

Further speculations

As a variation upon the shown and described preferred embodiments of the present invention, the present inventor has considered the possibility of utilizing either Ta or alternatively W in place of the Mo of the second preferred embodiment, and correspondingly utilizing either TaC or alternatively WC ceramic particles as the reinforcing ceramic particles, respectively. This is considered to be feasible, because the relevant ones of the properties of Ta and of W are generally similar to those of Mo. According to such variants of the present invention, it is considered to be plausible that it would be practicable to form, in either case, a composite layer having reinforcing TaC particles or reinforcing WC particles, on the surface of a piece of substrate aluminum alloy, the particles in said composite layer being well and uniformly dispersed, and said composite layer having no substantial defects such as blow holes or the like.

Although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. A method for forming a composite layer on the surface of an aluminum alloy substrate, comprising the steps of:
    (a) disposing a powder mixture containing a ceramic carbide of a metal, silicon and a metal element which forms with silicon an inter metallic compound having a specific gravity ratio of about 0.7 to about 2.0 relative to said ceramic carbide of a metal upon the surface of said aluminum alloy substrate; and:
    (b) irradiating with a laser said power mixture as disposed upon said surface of said aluminum alloy substrate, so as to melt said silicon and said metal element which forms said inter metallic compound with said silicon in said powder mixture and a surface portion of said aluminum alloy substrate and so as to fuse them together.

2. A method for forming a composite layer on the surface of an aluminum alloy substrate according to claim 1, wherein said silicon and said metal element which forms an inter metallic compound with silicon are provided as a powder of an alloy of said silicon and said metal element.

3. A method for forming a composite layer on the surface of an aluminum alloy substrate according to claim 2, wherein said metal element which forms an inter metallic compound with silicon is copper.

4. A method for forming a composite layer on the surface of an aluminum alloy substrate according to claim 1, wherein the content of said ceramic carbide of a metal included in said powder mixture is between about 0.1% and about 20%, and the content of silicon included in said powder mixture is between about 5% and about 95%.

5. A method for forming a composite layer on the surface of an aluminum alloy substrate according to claim 1, wherein the content of said ceramic carbide of a metal included in said powder mixture is between about 0.5% and about 15%, and the content of silicon included in said powder mixture is between about 7% and about 90%.

6. A method for forming a composite layer on the surface of an aluminum alloy substrate according to claim 1, wherein said powder mixture is disposed upon said surface of said aluminum alloy substrate by being supplied in loose powder form thereonto into the path of the beam produced by said laser.

7. A method for forming a composite layer on the surface of an aluminum alloy substrate according to claim 1, wherein the ratio of the specific gravity of said inter metallic compound formed by silicon and a metal to the specific gravity of said ceramic carbide of a metal is between about 0.8 and about 1.5.

8. A method for forming a composite layer on the surface of an aluminum alloy substrate according to any one of claims 1 through 7, wherein said ceramic carbide of a metal is titanium carbide.

9. A method for forming a composite layer on the surface of an aluminum alloy substrate according to claim 2, wherein said metal element which forms an inter metallic compound with silicon is molybdenum.

10. A method for forming a composite layer on the surface of an aluminum alloy substrate according to claim 9, wherein the content of said ceramic carbide of a metal included in said powder mixture is between about 0.1% and about 20%, and the content of silicon included in said powder mixture is between about 5% and about 95%.

11. A method for forming a composite layer on the surface of an aluminum alloy substrate according to claim 9, wherein the content of said ceramic carbide of a metal included in said powder mixture is between about 0.5% and about 15%, and the content of silicon included in said powder mixture is between about 7% and about 90%.

12. A method for forming a composite layer on the surface of an aluminum alloy substrate according to claim 6, wherein a carrier inert gas is fed into said loose powder form supply of said powder mixture.

13. A method for forming a composite layer on the surface of an aluminum alloy substrate according to claim 9, wherein the ratio of the specific gravity of said inter metallic compound formed by silicon and molybdenum to the specific gravity of said ceramic carbide of a metal is between about 0.8 and about 1.5.

14. A method for forming a composite layer on the surface of an aluminum alloy substrate according to any one of claims 1, 2, or 9 through 13, wherein said ceramic carbide of a metal is molybdenum carbide.

15. A method for forming a composite layer on the surface of an aluminum alloy substrate according to claim 1, wherein said silicon and a said metal element which forms an inter metallic compound with silicon are provided as respective powders.

16. A method for forming a composite layer on the surface of an aluminum alloy substrate according to claim 2, wherein said metal element which forms an inter metallic compound with silicon is Ta.

17. A method for forming a composite layer on the surface of an aluminum alloy substrate according to claim 2, wherein said metal element which forms an inter metallic compound with silicon is W.

18. A method for forming a composite layer on the surface of an aluminum alloy substrate according to claim 1, wherein a mixture of said powder mixture and said surface portion of said aluminum alloy substrate, as fused and melted by said laser, is cooled and solidified principally by heat conduction to the main body of said aluminum alloy substrate.

19. A method for forming a composite layer on the surface of an aluminum alloy substrate according to claim 1, wherein said irradiation of said powder mixture as disposed upon said surface of said aluminum alloy substrate by said laser is performed in an inert atmosphere.

20. A method for forming a composite layer on the surface of an aluminum alloy substrate according to claim 1, wherein said powder mixture is disposed upon said surface of said aluminum alloy substrate by being applied thereon as a paste including a binder.

* * * * *